United States Patent [19]
Wood

[11] Patent Number: 5,347,191
[45] Date of Patent: Sep. 13, 1994

[54] DYNAMIC TRANSFORMER POWER SUPPLY

[75] Inventor: Jonathan R. Wood, Sudbury, Mass.

[73] Assignee: Altor, Inc., Natick, Mass.

[21] Appl. No.: 904,590

[22] Filed: Jun. 26, 1992

[51] Int. Cl.$^5$ ............ H02K 47/04; H02K 47/14; H02K 47/20

[52] U.S. Cl. ............ 310/113; 363/108; 363/109; 363/175

[58] Field of Search ............ 310/113, 112, 114, 74, 310/90; 322/4, 15; 363/102, 104, 105, 32, 91, 107, 108, 109, 175

[56] References Cited

U.S. PATENT DOCUMENTS

| | | | |
|---|---|---|---|
| 4,406,950 | 9/1983 | Roesel, Jr. | 290/4 C |
| 4,412,170 | 10/1983 | Roesel, Jr. | 322/4 |
| 4,612,486 | 9/1986 | Ban et al. | 310/113 X |
| 4,617,507 | 10/1986 | Eisenhaure et al. | 322/4 |
| 4,663,536 | 5/1987 | Roesel, Jr. et al. | 290/7 |
| 4,723,735 | 2/1988 | Eisenhaure et al. | 322/4 X |
| 4,801,776 | 1/1989 | Cornell | 310/113 X |

Primary Examiner—Steven L. Stephan
Assistant Examiner—Ed To
Attorney, Agent, or Firm—Burns, Doane, Swecker & Mathis

[57] ABSTRACT

In a power supply for use with electronic equipment, the power supply includes a dynamic transformer having a single rotary element with permanent magnets attached, magnetic bearings to support the rotary element during operation, primary and secondary windings linking the flux of the magnets, circuit means to drive the primary windings, and means of using the secondary AC output to provide DC power at the point of use.

24 Claims, 14 Drawing Sheets

Fig. 1

| Performance Measure | Power Supplies | UPSs |
| --- | --- | --- |
| Reliability (MTBF) | Excellent | N/A |
| W/in$^3$ | Excellent | N/A |
| $/W | Excellent | N/A |
| Holdup Time | Inadequate | Overkill |
| Volume | N/A | Poor |
| $/J | N/A | Poor |
| Dependability | N/A | Arguable |
| Isolation | Variable | Variable |
| Peak power capability | Inadequate | N/A |
| Power Factor | Optional | N/A |

*Fig. 5*

| Measure | Switching Supplies | UPSs | Floating State™ Supplies |
|---|---|---|---|
| Reliability | Excellent | N/A | Excellent |
| W/in³ | Excellent | N/A | Excellent |
| $/W | Excellent | N/A | Excellent |
| Holdup Time | Inadequate | Overkill | Excellent |
| Volume | N/A | Poor | Excellent |
| $/J | N/A | Poor | Excellent |
| Dependability | N/A | Arguable | Excellent |
| Isolation | Variable | Variable | Excellent |
| Peak power | Inadequate | N/A | Excellent |
| Power Factor | Optional | N/A | Standard |

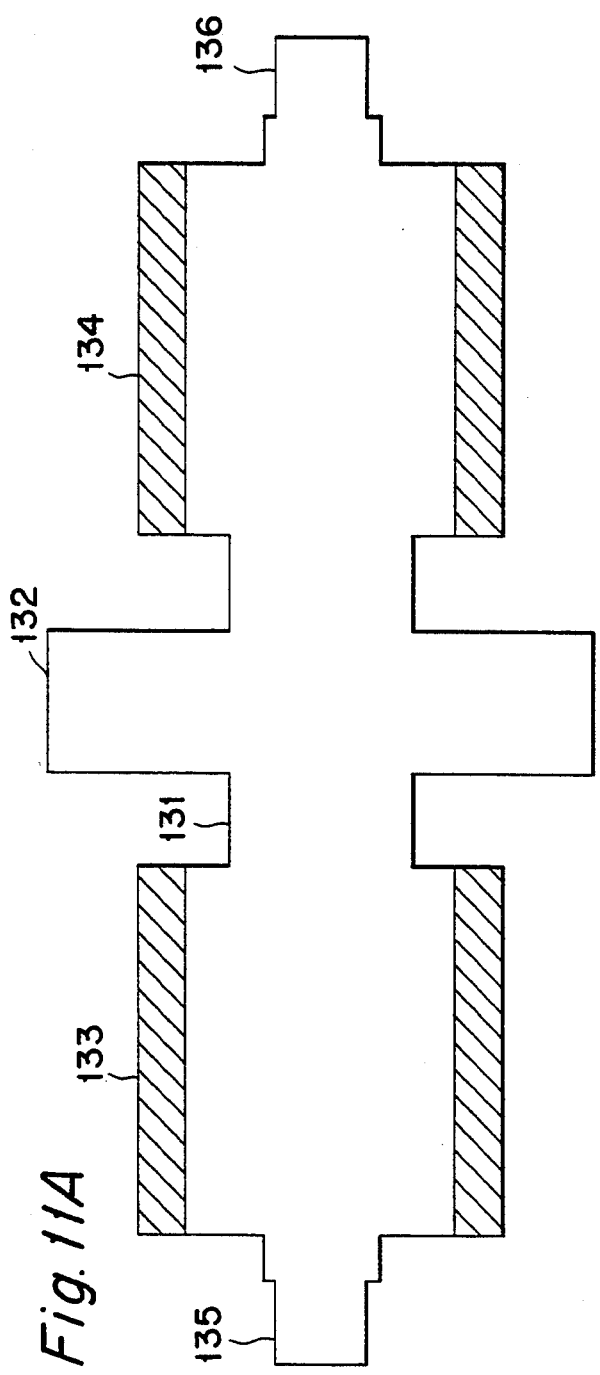
Fig. 11A
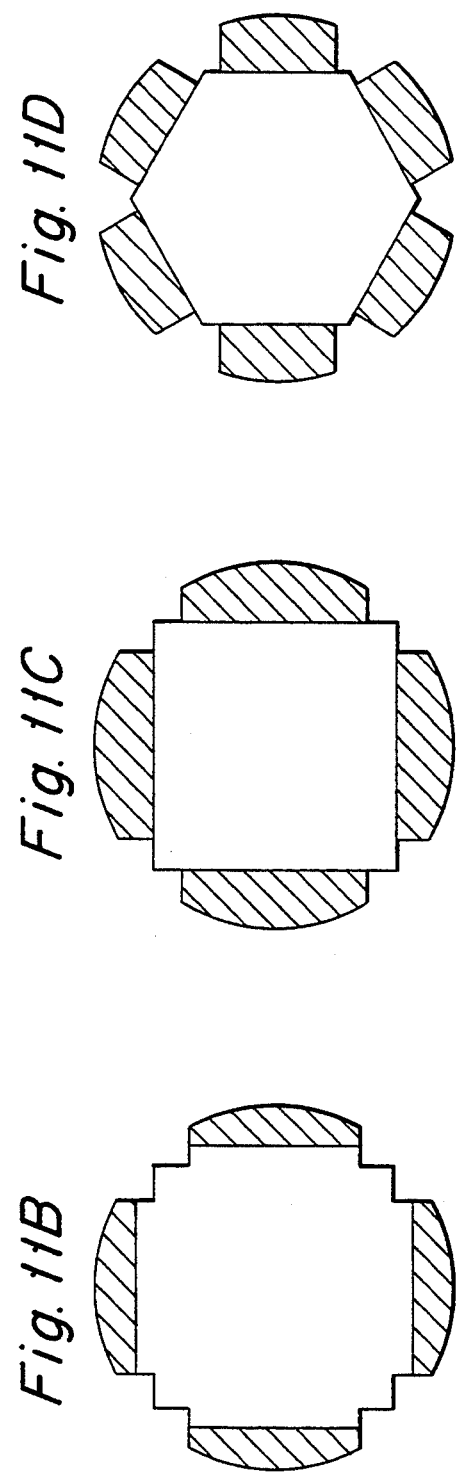
Fig. 11D
Fig. 11C
Fig. 11B

DYNAMIC TRANSFORMER POWER SUPPLY

BACKGROUND OF THE INVENTION

1. Field of the Invention

The present invention relates generally to power supplies for electronic equipment, and more particularly to power supplies in which electro-mechanical means are employed to provide hold-up times in the range of 0.1 to 10 seconds, together with excellent rejection of power line transients, the ability to deliver power several times rated output for short periods, and the option of operating at high line power factor from single-phase AC lines. Hold-up time is defined as the amount of time for which a power supply can sustain its output within regulation limits following loss of AC input power.

2. Description of the Prior Art

All electronic equipment requires direct current electricity ("CDC") for its internal operation. Such equipment includes computers, communications systems, televisions, radios, medical electronics devices, military electronics systems, and more. In most of these cases, the internal DC is obtained by conversion from a source of alternating-current electricity ("AC"), either in single-phase or three-phase form. The subsystem which is used to convert the incoming AC to the point-of-use DC is referred to as the "power supply".

Usually, the power supply is located internal to the piece of equipment it supplies. Because the AC power may fluctuate, or may vanish for short intervals, equipment installations often incorporate ancillary devices to mitigate or eliminate the effects of these supply variations. Devices which mitigate power fluctuations are generally referred to as power conditioners, and devices which provide an alternate source of power when the AC is temporarily absent are referred to as battery backup systems or uninterruptible power supplies (UPSs).

The industry which manufactures power conversion equipment is structured in terms of providing power supplies, power conditioners, and battery backup systems. One of several insights which motivate the present invention is that the fundamental need of electronic equipment is for direct current electricity, rather than for power supplies, battery backup systems, or power conditioners. Another such insight is that the existing industry structure derives from the available technologies for electricity storage.

It is widely accepted that three important performance measures for power supplies are:
1) Reliability, usually expressed in terms of mean-time-between-failure (MTBF),
2) Power Density, expressed in rated power output per unit volume, typically in watts per cubic inch (W/in3),
3) Cost, usually expressed in dollars per watt ($/W) of rated output power.

For Battery Backup Systems, the following performance measures are of primary concern:
1) Holdup Time, as defined above, measured in seconds or minutes,
2) Volume, expressed either in joules per cubic inch (J/in3) or in W/in3,
3) Cost, expressed in $/J,
4) Dependability, measured in terms of the probability of failing to deliver the required energy when called upon. (One faulty battery cell in a series connection can cause a UPS to malfunction, and may not be detected until the UPS is needed).

Other requirements for a power supply include:
1) Isolation capability, i.e., the ability to protect the electronic equipment from rapid fluctuations (noise spikes) on the AC power line,
2) Peak Power Capability, i.e., the ability to deliver power several times rated output for short periods,
3) High Power Factor, i.e., the ability to extract power from the AC line smoothly, with the current waveform matching the voltage waveform, rather than with a pulsating current waveform.

FIG. 1 lists these performance measures, and shows how existing commercially-available hardware performs relative to these figures of merit. In summary, the combination of power supplies and UPSs fails to provide an ideal technical solution to all of the requirements for a system whose primary purpose is to deliver direct current electricity to an item of electronic equipment.

FIG. 2 provides an explanation. In the upper part of this figure, rated output power is plotted against holdup time, both scales being logarithmic. The left-hand region of the chart shows the capabilities of conventional power supplies, while UPSs appear at the right-hand side, leaving a void in the center. Conventional motor-generators make an inroad into the void at higher power levels, but suffer the disadvantages of excessive physical bulk and insufficient holdup time to cover the majority of outages. In the lower part of FIG. 2, well-established statistical data are summarized in a plot of the percentage of power outages versus their duration, as experienced at most AC power outlets, worldwide. It can be seen that a holdup time of 1–2 seconds will cover almost all outages, whereas conventional power supplies are entirely inadequate in this regard. UPSs provide much more holdup than is necessary to cover the majority of outages, but still do not provide sufficient energy to cover all outages such as those lasting several hours or more. These inadequacies of the prior art are solved by the present invention.

FIG. 3 charts energy storage densities on a logarithmic scale for five energy-storing media. Three of these provide energy storage and retrieval directly in the form of electricity, these three being inductors, capacitors, and batteries. The fourth medium, small flywheels, permits electricity storage and retrieval when coupled to an electric motor. These four media are the only known means for storing and retrieving electricity directly. The fifth medium shown in FIG. 3, fossil fuels, is shown only by way of comparative reference.

The relative positions of capacitors (which are used for holdup energy in power supplies) and batteries (which are employed in UPSs) illustrate why there is a void region in the upper chart of FIG. 2. Another reason for this, not so obvious, is the fact that the quantity of batteries which are necessary for a UPS to meet its power output requirement will give a holdup time measured in minutes rather than seconds.

A motivating insight for the present invention is the fact that small flywheels in conjunction with electric motors and generators can provide a means to produce a power supply which has holdup times in the range 1 to 5 seconds (or more, or less, if desired), and which occupies very little more physical space than a conventional power supply. The present invention, however, goes far beyond the mere assemblage of conventional devices. A novel integration of elements via a unique mechanical arrangement provides a new class of electronic circuit device which is referred to as a dynamic transformer. When a power supply includes a dynamic transformer, it is referred to as dynamic transformer power supply or a floating state power supply.

FIG. 4 shows how dynamic transformer power supplies fill the void in the upper chart of FIG. 2. With a dynamic transformer power supply, an item of electronic equipment will not require an ancillary power conditioner or battery backup system in many applications where it otherwise would have.

FIG. 5 lists the performance measures given in FIG. 1, and shows that the dynamic transformer power supply overcomes the deficiencies of the prior art in means for supplying direct current electricity to electronic equipment.

BRIEF SUMMARY OF THE INVENTION

It is a primary object of this invention to provide an improved power supply for use with electronic equipment.

A device for implementing the invention includes a dynamic transformer apparatus employing a single rotary element apparatus with permanent magnet apparatus attached, magnetic or other bearing apparatus to support the rotary element during operation, primary and secondary winding apparatus linking the flux of the magnets, circuit means to drive the primary windings, and means of using the secondary AC output in any of several ways to provide DC power at the point of use. Preferably, the dynamic transformer apparatus includes means for simultaneously delivering the input and output of variable frequency electrical energy to and from the primary and secondary windings. A flywheel apparatus may or may not be attached to the rotary element.

It is an advantage of the present invention that it provides a means for implementing a power supply with the inherent ability to sustain its DC output within regulation limits, immediately following the loss of AC input power, for a period of 0.1 to 10 seconds (or longer), without relying on batteries, without occupying significantly more volume than a conventional power supply, and without costing substantially more than a conventional power supply.

It is a further advantage that a power supply employing the invention will provide inherent protection of its DC output from power line disturbances.

It is another advantage that such a power supply will have the ability to deliver a power output several times greater than the rated output power for the device.

It is yet another advantage that a power supply employing the invention may be configured to operate at high AC line power-factors, i.e. greater than 0.95.

It is even yet another advantage that power supplies employing the invention may be configured to operate when connected in parallel.

Other objects, features and advantages of the present invention will be understood by those of ordinary skill in the art after reference to the detailed description of the preferred embodiment and accompanying drawings wherein:

BRIEF DESCRIPTION OF THE DRAWINGS

FIG. 1 is a list of performance measures for power supplies and UPSs.

FIG. 5 is a list of performance measures for power supplies, UPSs, and the dynamic transformer power supplies of the present invention.

FIGS. 11A-11D are drawings of a rotary element apparatus for use in the arrangement of FIG. 10.

DESCRIPTION OF THE PREFERRED EMBODIMENT

The preferred embodiment of this invention employs a dynamic transformer operating at rotational speeds greater than 5,000 RPM, with a single rotary element, which may or may not have a flywheel attached. The preferred embodiment includes magnetic (or other) bearings to support the rotary element during operation. There are preferably permanent magnets disposed on both primary and secondary ends of the rotary element. The primary and secondary windings link the flux of the magnets. Electronic circuitry drives the primary windings. The secondary AC output is used in any of at least three ways to produce regulated DC voltage.

The possible secondary AC outputs include: (i) a secondary AC output which may be rectified and distributed as an intermediate DC voltage (e.g. 40-60 V DC) for use with DC-DC converter modules which produce the point-of-use voltage; (ii) a secondary AC output which may be rectified and regulated to a point-of-use voltage (e.g. 5 V DC) via a magnetic amplifier circuit or a phase-controlled rectifier circuit; or (iii) a secondary (incorporating transformers and magnetic amplifiers or semiconductor phase control) which produce the point-of-use voltage.

Figure 2:
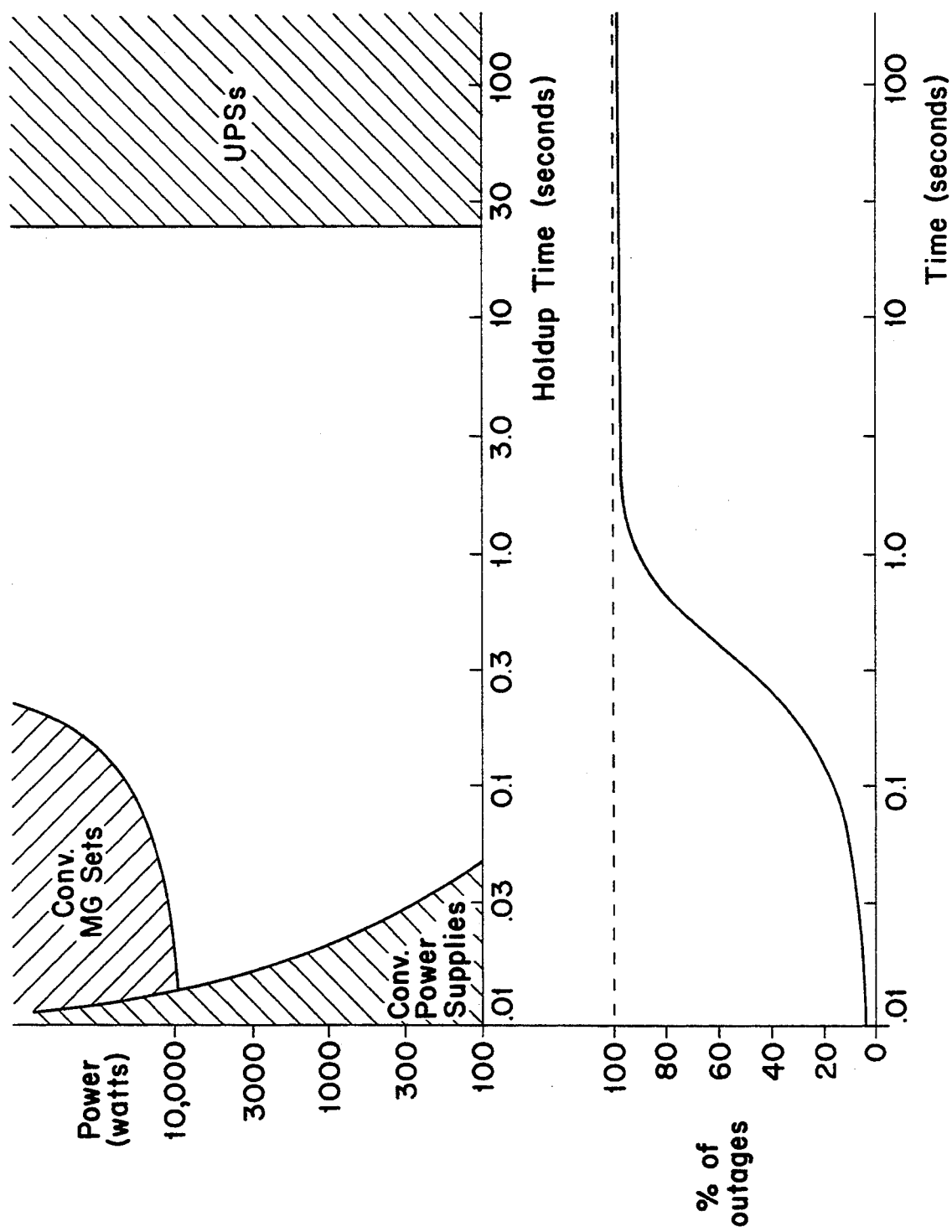
FIG. 2 is a comparative depiction of the holdup capabilities of power supplies and UPSs.
Figure 3:
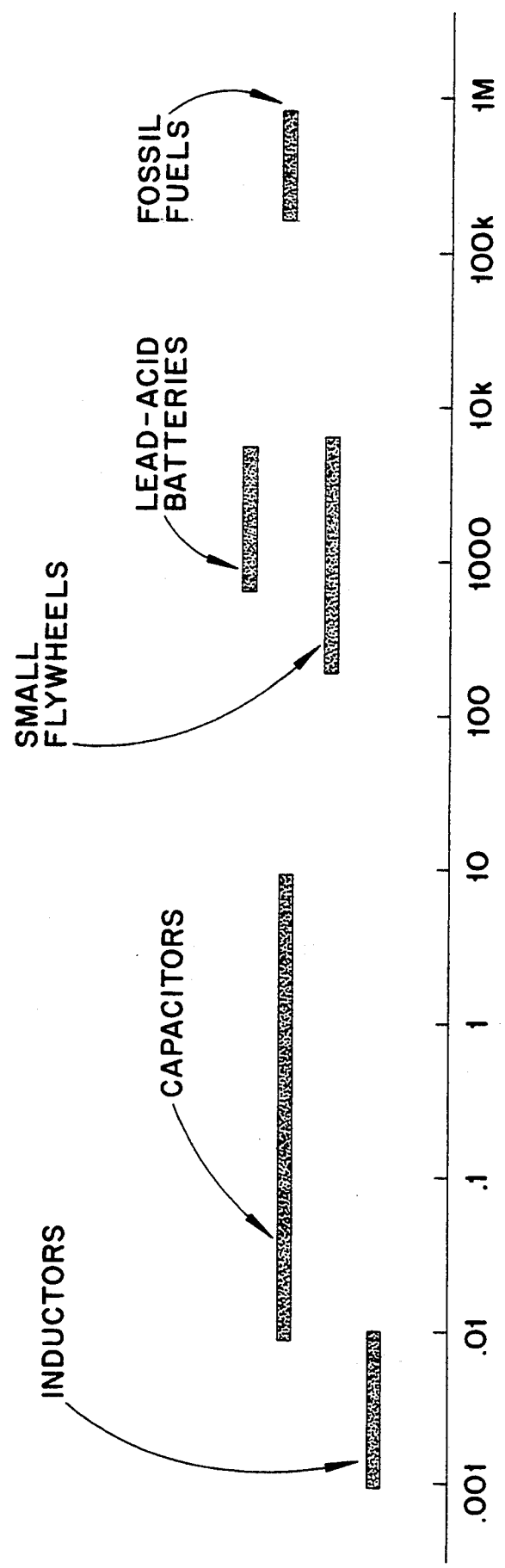
FIG. 3 is a comparative depiction of energy storage densities of various media.
Figure 4:
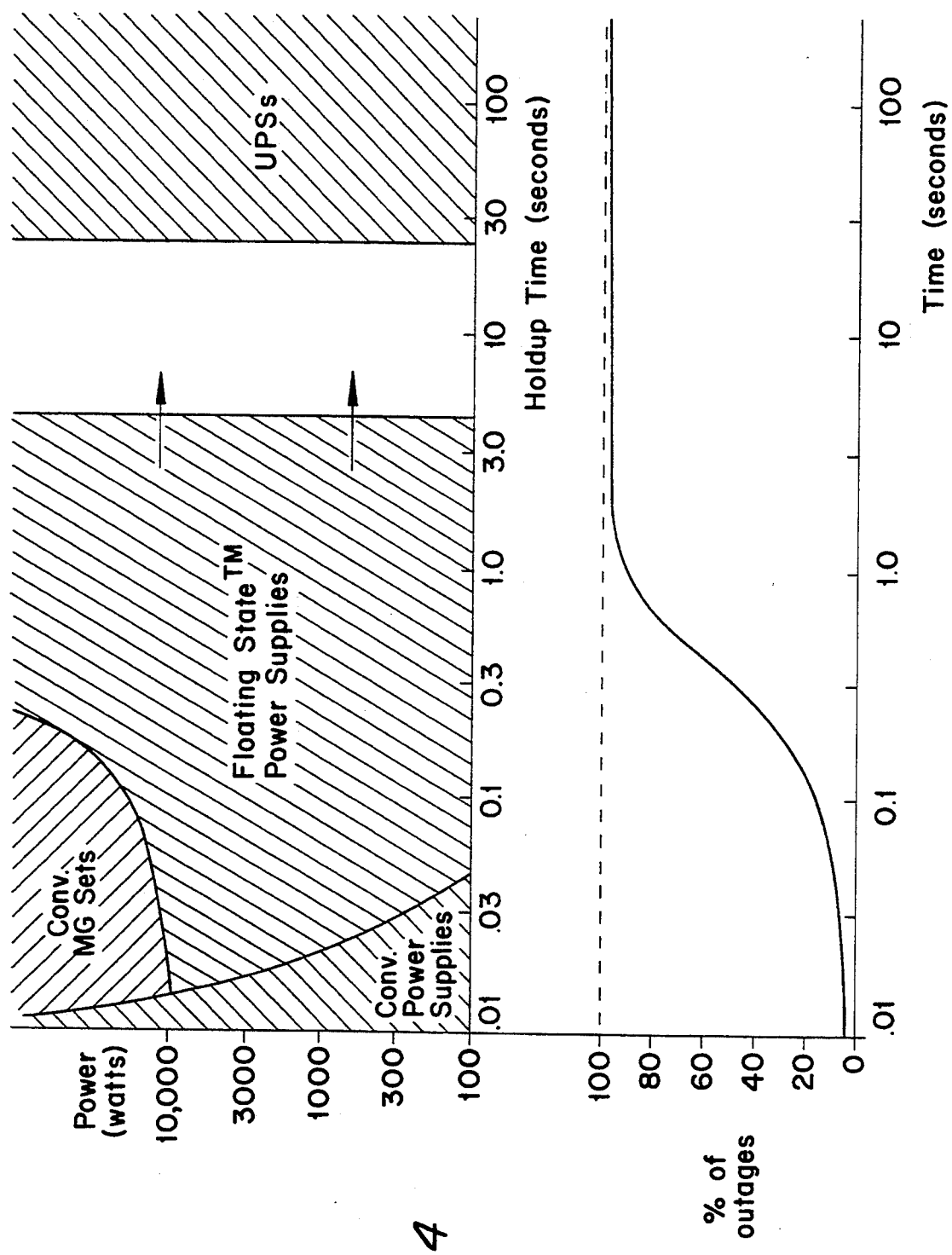
FIG. 4 is a comparative depiction of the holdup capabilities of conventional devices and the dynamic transformer power supplies of the present invention.
Figure 6:
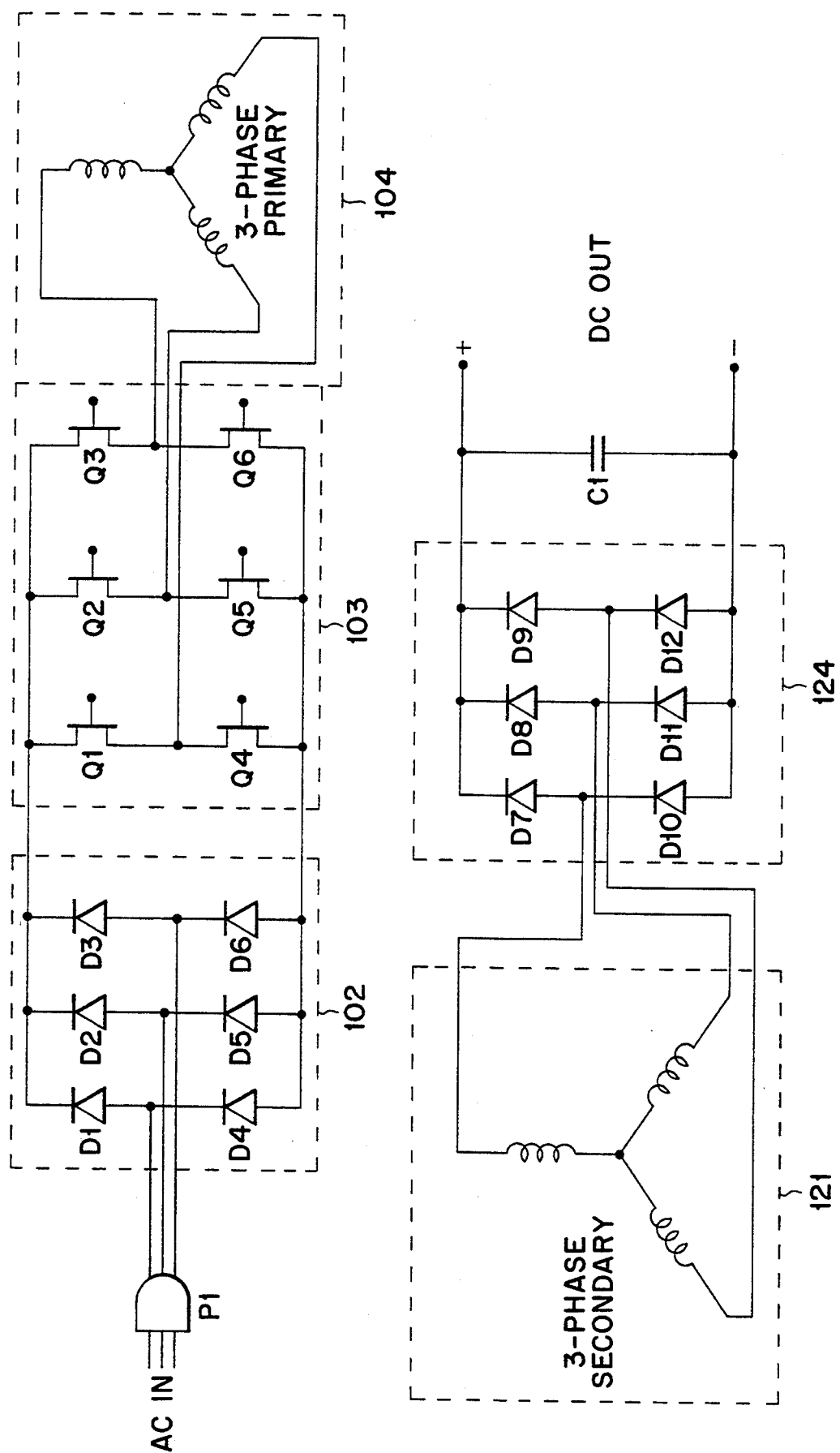
FIG. 6 is a simplified power flow schematic for this invention.

Referring to FIG. 6, AC input obtained via plug P1 is fed to a rectification bridge 102 formed by diodes D1 through D6. A three-phase implementation is shown in FIG. 6, but for a single-phase full-wave rectifier implementation diodes D3 and D6 are omitted, and for a single-phase half-wave rectifier implementation diodes D2, D3, D5, and D6 are omitted.

Transistors Q1 through Q6, which together form chopper bridge 103, are driven by circuitry (not shown in FIG. 6) in such a manner as to produce a chopped three-phase waveform to feed the three-phase primary windings 104. Transistors Q1 through Q6, together with windings 104, ancillary rotor-position devices, and appropriate gate-drive (or base-drive) circuitry, constitute a "brushless-DC" motor drive system. In a typical application for this invention, the rotary element of 104 will be driven at rotational speeds between 20,000 and 100,000 RPM. A first set of permanent magnets attached to the rotary element has flux-linkage through the windings 104.

A second set of permanent magnets is attached to the rotary element (further along its axis) to induce voltage in the windings of the three-phase secondary 121. The primary windings 104 and the secondary windings 121 are physically separate and have no mutual electromagnetic coupling. A small flywheel may be attached to the rotary element to increase its moment of inertia, but even without a clearly identifiable flywheel attached, the rotary element will have substantial useful inertia by virtue of the mass incorporated in the rotary element structure, including the permanent magnets.

The output of secondary 121 is fed to diodes D7 through D12 which form a bridge rectifier 124. Optional capacitor C1 performs the task of reducing the output voltage ripple.

During normal operation of this power supply, the rotary element is driven at a constant rotational speed. Because the secondary 121 is a permanent-magnet machine, constant rotational speed yields nearly-constant DC voltage out. The nominal (steady-state) output voltage may be 60 V DC, for example. When the incoming AC is interrupted, the rotational speed falls at a rate determined by the amount of rotational energy stored in the rotary element and by the load power. The stored rotational energy is proportional to the square of the rotational speed. Hence, when the speed has fallen to two-thirds of its initial value, the output voltage will have fallen to approximately two-thirds of its prior value (i.e., to 40 V DC in the example), and five-ninths of the rotational energy stored in the rotary element will have been extracted. Thus a majority of the stored energy is utilized, while maintaining the output voltage within a reasonable range which can be accommodated by one of several post-regulation means, as explained below.

Figure 7:
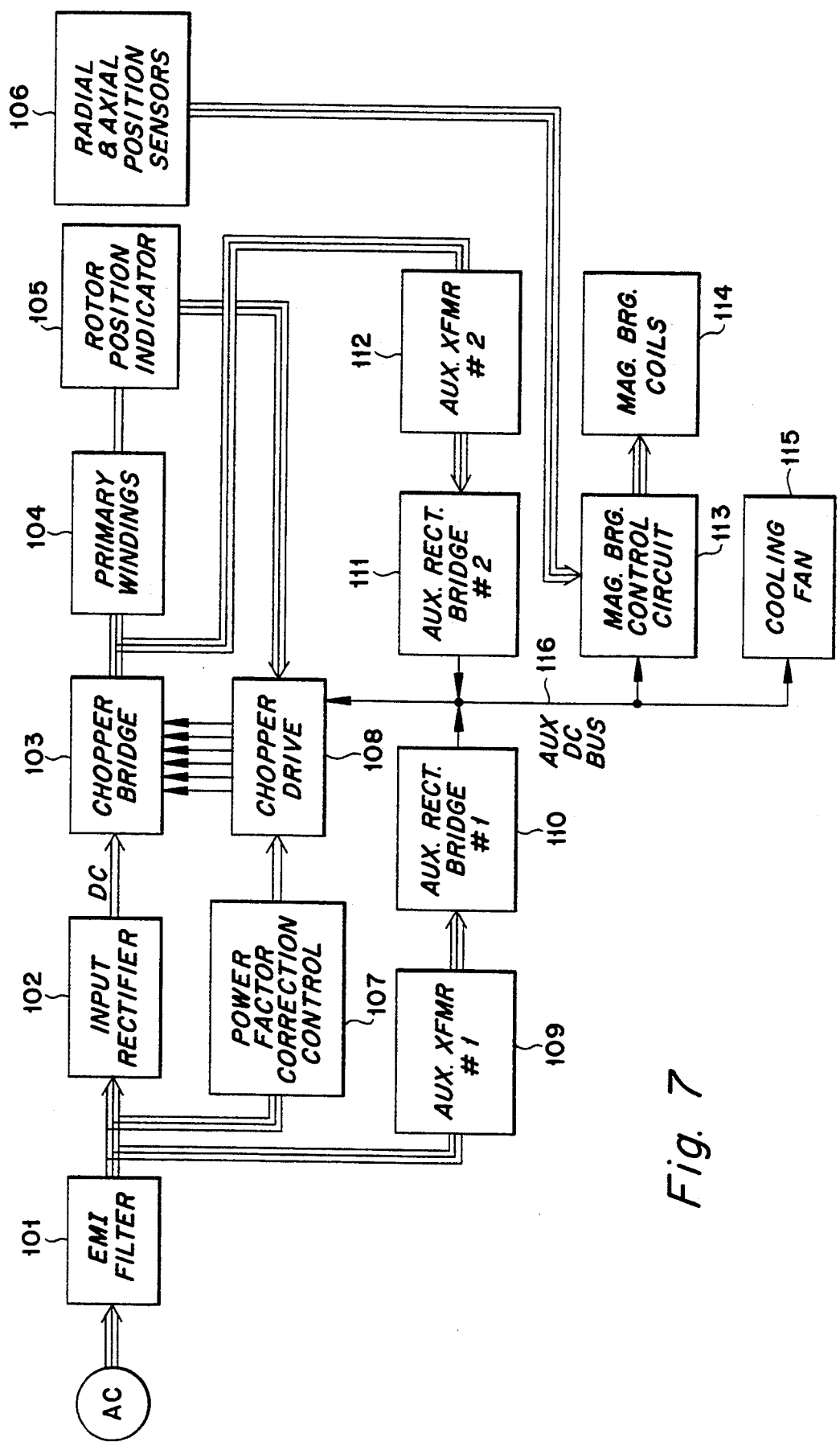
FIG. 7 is a functional block diagram of the primary side of the power supply apparatus.

In FIG. 7, the functional blocks on the primary side of the power supply are shown, together with their interconnections. Some of the items in FIG. 7 are absent in FIG. 6 for the sake of clarity. Looking at FIG. 7, the incoming AC is passed through filter 101 whose purpose is to reduce electromagnetic interference (EMI), thence to the main input rectifier 102 which feeds the chopper bridge 103 as explained above. The chopper bridge 103 feeds the primary windings 104. Chopper drive 108 receives signals from the rotary position sensor 105, and from power factor control circuit 107. This control circuit 107 connects to the filtered AC, and may be omitted where power factor correction is not a concern. Auxiliary transformer 109 is fed from the filtered AC, and feeds a first auxiliary rectifier bridge 110, the output of which connects to the auxiliary DC bus 116. The purpose of DC bus 116 is to provide power to the chopper drive 108, and to the magnetic bearing control circuitry 113, as well as to the cooling fan 115. A second auxiliary transformer, 112, is fed from the primary windings 104, and via a second auxiliary rectifier bridge, 111, feeds power to the DC bus 116 when the incoming AC power is interrupted. Magnetic bearing control circuit 113 receives signals from the radial and axial rotary element position sensors 106, and feeds the magnetic bearing coils 114.

Figure 8:
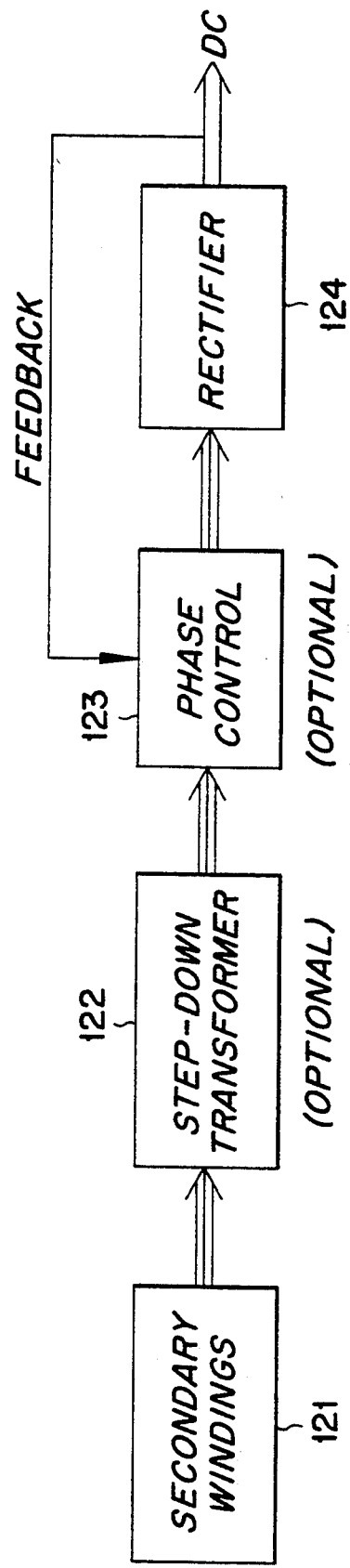
FIG. 8 is a functional block diagram of the secondary side of the power supply apparatus.

In FIG. 8, the functional blocks on the secondary side of the power supply are shown, together with their interconnections. The optional items in FIG. 8 are absent in FIG. 6 for the sake of simplicity, these items being a step-down transformer 122 and a phase control apparatus 123. The action of these optional items is explained below.

Figure 9:
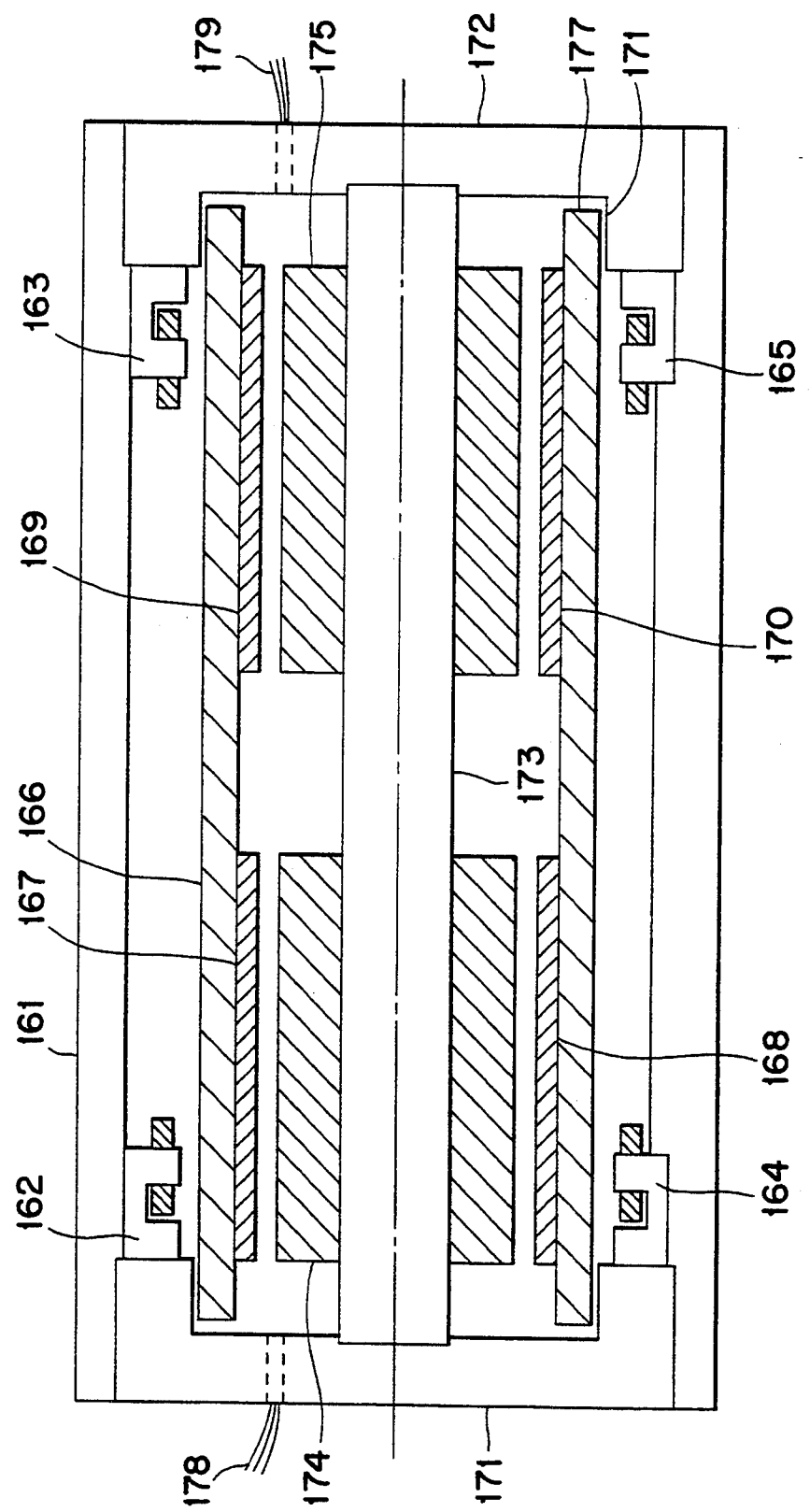
FIG. 9 is a drawing of an embodiment of the mechanical arrangement of the dynamic transformer apparatus.

FIG. 9 is an axial section drawing of an embodiment of the mechanical arrangement of the dynamic transformer apparatus, in which the rotary element is constructed in the form of a cylinder with permanent magnets attached to its inside surfaces. Housing 161 holds magnetic bearings 162 through 165. The targets for the magnetic bearings are the outside surfaces of rotating cylinder 166, which performs the roles of providing rotational inertia, and of supporting primary magnets 167, 168, and secondary magnets 169, 170. Endbells 171 and 172 support a stationary central shaft 173, which in turn supports primary windings 174 and secondary windings 175. Touch-down bearing surfaces are incorporated in the endbells at locations 176, 177. Primary leads 178 and secondary leads 179 are led through the endbells as shown.

Figure 10:
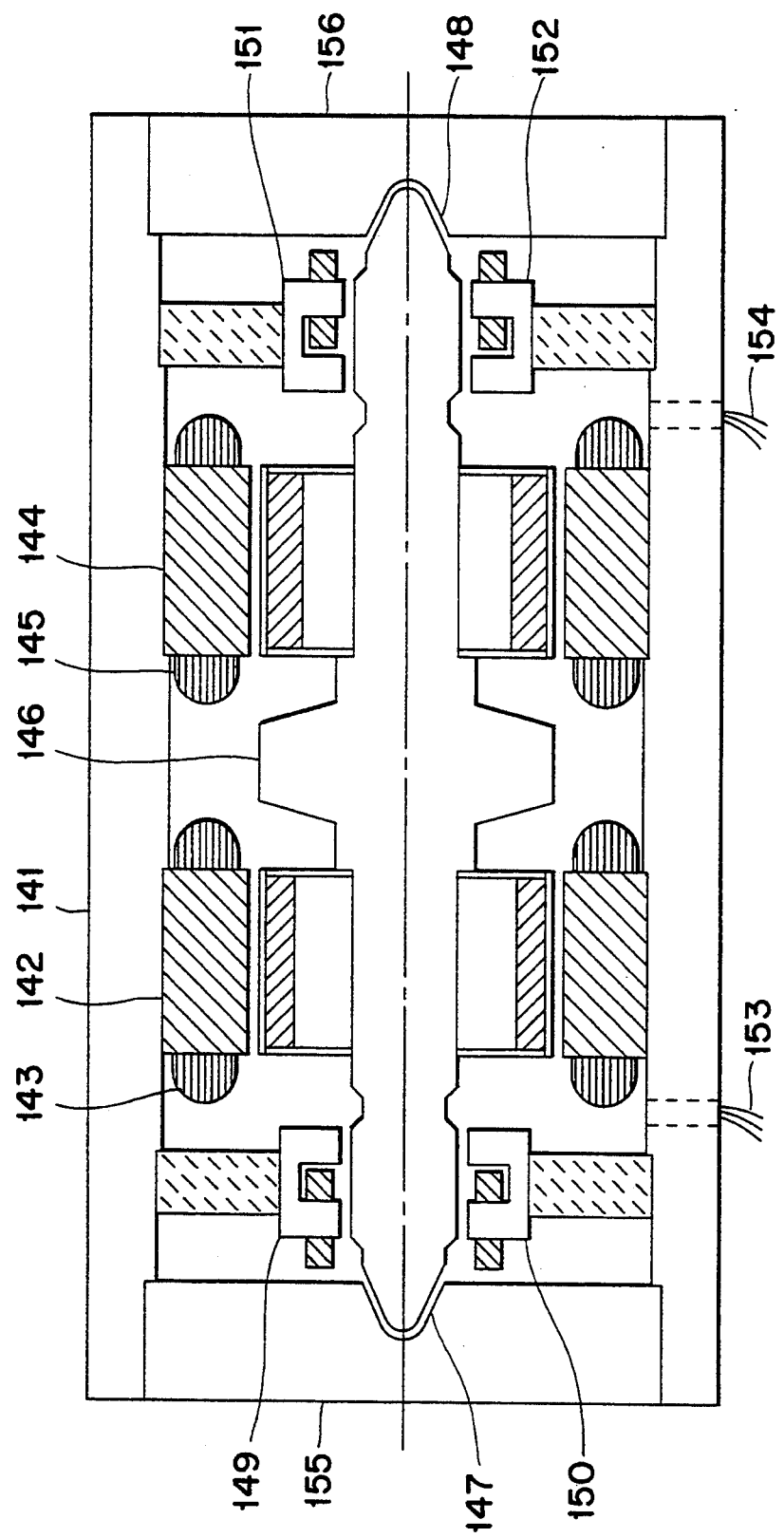
FIG. 10 is a drawing of an alternative mechanical arrangement of the Dynamic Transformer apparatus.

FIG. 10 is an axial section drawing of an alternative mechanical arrangement of the dynamic transformer. Housing 141 holds the primary stator laminations 142 and secondary laminations 144, which in turn hold the primary windings 143 and secondary windings 145. Rotary element 146 is supported when at rest by touch-down bearings 147 and 148, and during operation by magnetic beatings 149 through 152. Primary leads 153 and secondary leads 154 are led through housing 141 as shown. The touch-down bearings 147 and 148 are incorporated into endbells 155 and 156.

FIG. 11A is a drawing of a representative rotary element for use in the arrangement of FIG. 10. Shaft 131 has an optional flywheel 132 attached. Permanent magnets 133 are for the primary, and permanent magnets 134 are for the secondary. Surfaces 135 and 136 are the magnetic beating targets. The cross-sectional views FIGS. 11B–11D show three possible alternative arrangements for the magnets. Although not shown in FIG. 11, non-magnetic containment rings will usually be required around the magnets in order to keep them in place under the action of centrifugal force during operation.

Figure 12:
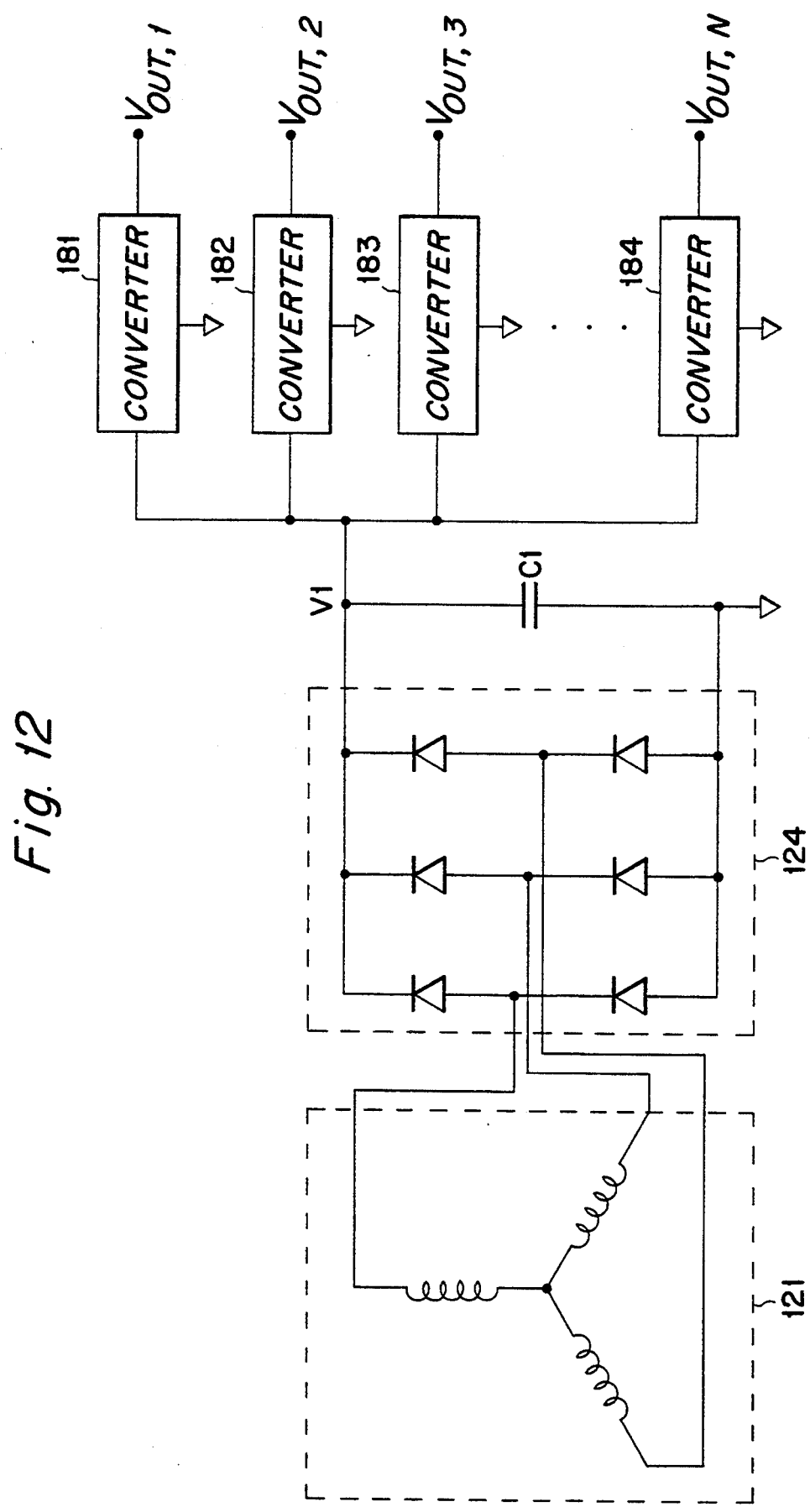
FIG. 12 is a schematic showing a first means of regulating the output voltage of the power supply apparatus.

FIG. 12 is a schematic showing a first means of regulating the output voltage of the power supply apparatus, in which the secondary AC output may be rectified and distributed as an intermediate DC voltage (e.g. 40–60 V DC) for use with DC-DC converter modules 181 through 184 which produce the point-of-use voltages Vout, 1 through Vout,N. In normal operation voltage V1 may be 60 V DC, for instance, falling to 40 V DC following loss of AC input to the power supply. The DC-DC converters are chosen to be capable of operating over an input voltage range of 3:2 (60–40 V in our example).

Figure 13:
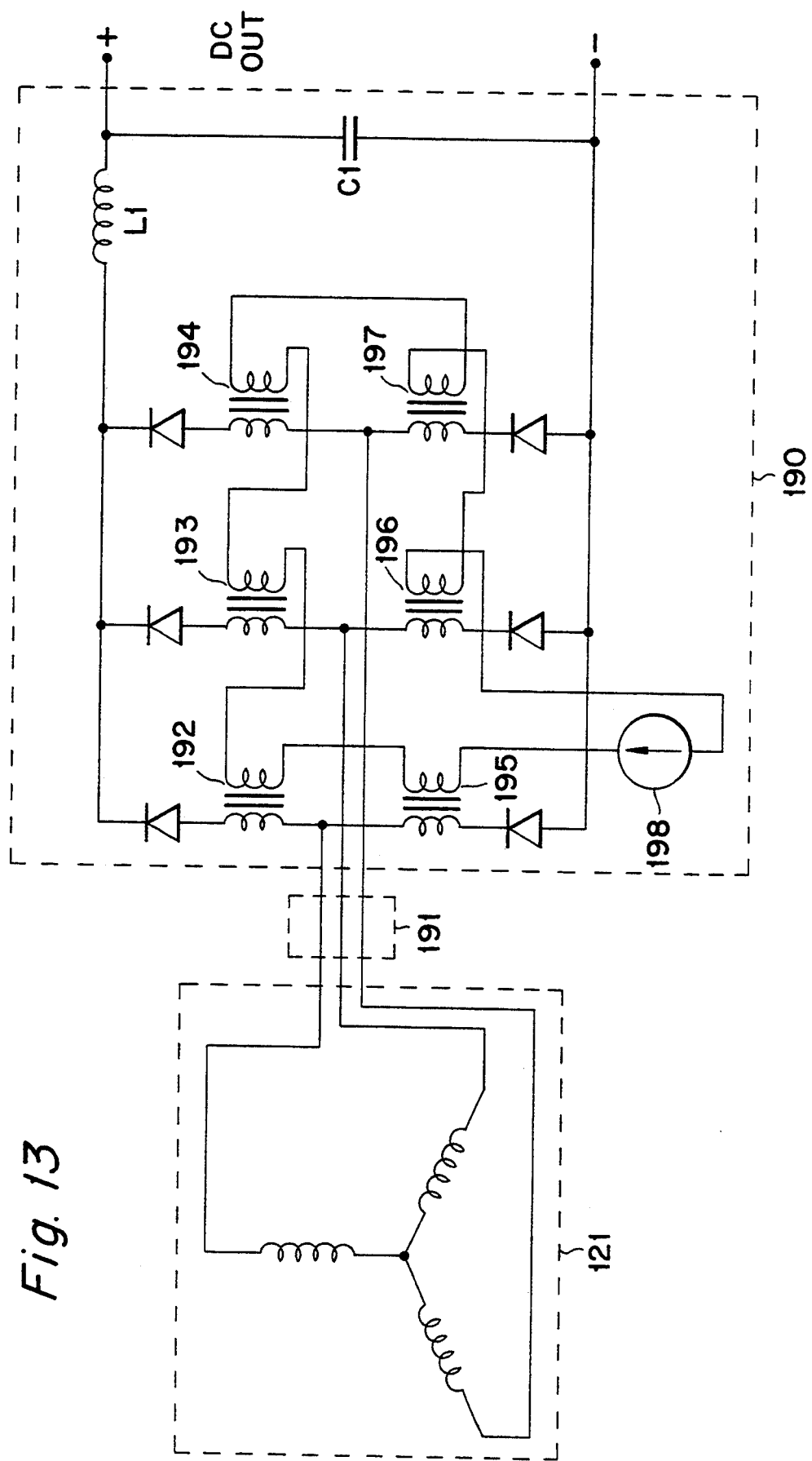
FIG. 13 is a schematic showing a second means of regulating the output voltage of the power supply apparatus.

FIG. 13 shows a second means of regulating the output voltage of the power supply apparatus, in which the secondary AC output is rectified and regulated to a point-of-use voltage (e.g. 5 V DC) via a magnetic amplifier circuit 190. The three-phase AC output 191 of the secondary 121 feeds a full-wave rectifier bridge in which magnetic amplifier transformers 192 through 197 are placed in series with the diodes. The control windings of transformers 192 through 197 are connected in a series loop which is fed with a DC current from current source 198. Not shown in FIG. 13 is a feedback connection from the DC output to the current source 198, to effect voltage regulation of the output. Inductor L1 and capacitor C1 together form a filter to reduce output voltage ripple.

Figure 14:
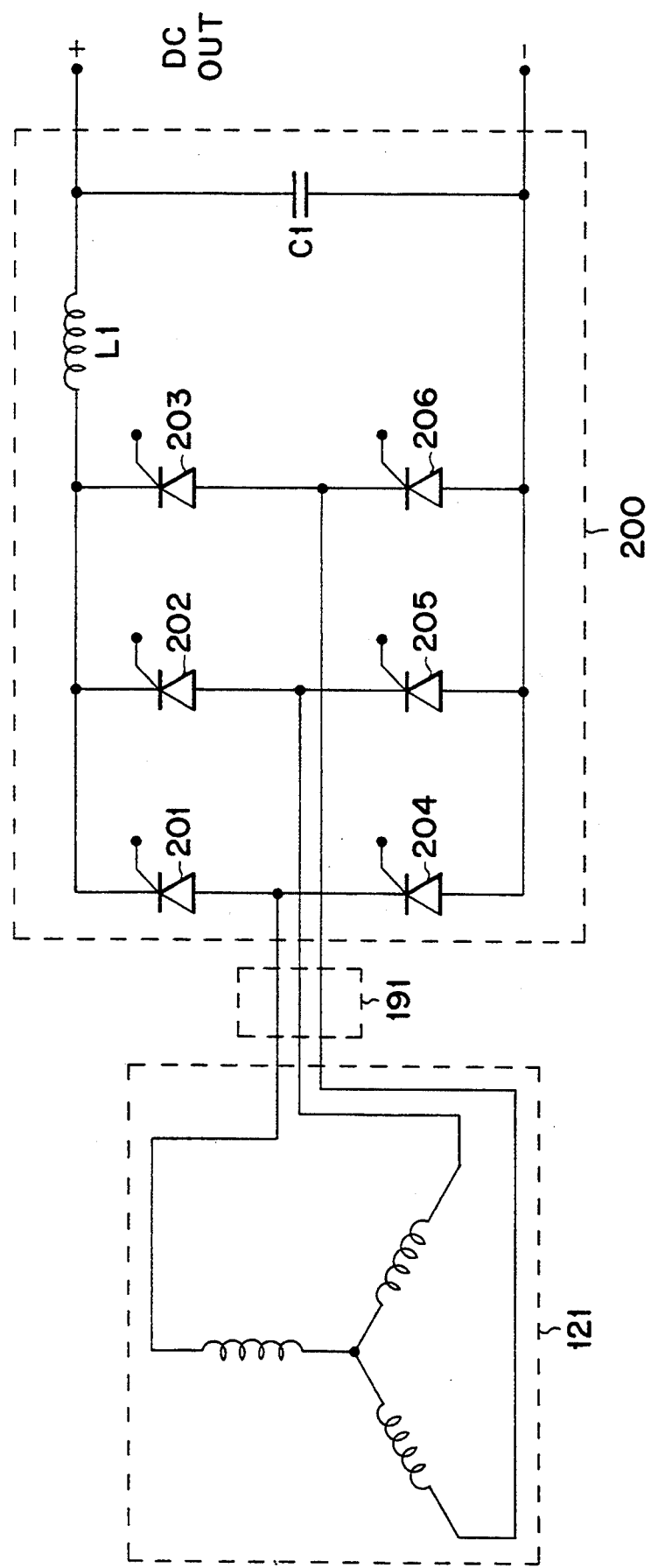
FIG. 14 is a schematic showing a variation of the second means of regulating the output voltage of the power supply apparatus.

FIG. 14 shows a variation of the method depicted in FIG. 13 for regulating the output voltage of the power supply apparatus. In FIG. 14, a six-pulse phase-controlled rectifier 200 takes the place of the magnetic amplifier circuit 190. Controlled rectifiers 201 through 206 are driven from a controller, not shown in FIG. 14, which receives a feedback signal from the DC output, in order to effect voltage regulation. Inductor L1 and capacitor C1 together form a filter to reduce output voltage ripple.

A third means of regulating the output voltage of the power supply apparatus can be effected by distributing the three-phase output 191 of secondary 121, and employing AC-DC converter modules (incorporating transformers and magnetic amplifiers or semiconductor phase control) which produce the point-of-use voltage.

The invention may be embodied in yet other specific forms without departing from the spirit or essential characteristics thereof. The present embodiment is therefore to be considered in all respects as illustrative and not restrictive. The scope of the invention is indicated by the appended claims rather than by the foregoing description, and all changes which come within the meaning and range of equivalency of the claims are intended to be embraced therein.

I claim:

1. A dynamic transformer for converting a source of AC or DC input power to AC or DC output power for use in electronic equipment, said dynamic transformer comprising:
    a primary winding;
    a secondary winding, physically separated from the primary winding and having no electromagnetic coupling with the primary winding;
    a relatively high speed rotary element, cooperating with two sets of permanent magnets, the flux of the first set of permanent magnets being linked to said primary winding and the flux of the second set of permanent magnets being linked to said secondary winding;
    bearing means for supporting said rotary element during operation; and
    means for simultaneously delivering the input and output of electrical energy to and from said primary winding and said secondary winding.

2. The apparatus of claim 1 wherein said bearing means includes magnetic bearings.

3. The apparatus of claim 1 wherein said rotary element further includes a flywheel.

4. The apparatus of claim 2 wherein said rotary element further includes a flywheel.

5. The apparatus of claim 1 wherein said means for simultaneously delivering the input and output further includes means for regulating the output voltage of the secondary winding.

6. The apparatus of claim 5 wherein the means for regulating includes means of rectifying and distributing the secondary output as an intermediate DC voltage for use with DC-DC converter modules.

7. The apparatus of claim 5 wherein the means for regulating includes a magnetic amplifier rectification device.

8. The apparatus of claim 5 wherein the means for regulating includes a phase-controlled rectification device.

9. The apparatus of claim 5 wherein the means for regulating includes means for distributing a secondary AC output as an intermediate AC voltage for use with AC-DC converter modules.

10. The apparatus of claim 2 wherein the means for simultaneously delivering the input and the output further includes means for regulating the output of the secondary winding.

11. The apparatus of claim 10 wherein the means for regulating includes means for rectifying and distributing the secondary output as an intermediate DC voltage for use with DC-DC converter modules.

12. The apparatus of claim 10 wherein the means for regulating includes a magnetic amplifier rectification device.

13. The apparatus of claim 10 wherein the means for regulating includes a phase-controlled rectification device.

14. The apparatus of claim 10 wherein the means for regulating includes means of distributing a secondary AC output as an intermediate AC voltage for use with AC-DC converter modules.

15. The apparatus of claim 2 wherein the rotary element further includes a cylindrical member having the permanent magnets attached on its inside, arranged to give electromagnetic coupling with the primary and secondary windings means which are mounted on a stationary central shaft passing inside the cylindrical member.

16. The apparatus of claim 15 wherein the magnetic bearing means is disposed on the outside of the cylindrical member, such that magnetic bearing targets are disposed on an exterior surface of the cylindrical member.

17. The apparatus of claim 15 wherein the magnetic beating means is disposed on the inside of the cylindrical member, such that magnetic beating targets are disposed on an interior surface of the cylindrical member.

18. The apparatus of claim 2 wherein the rotary element further includes the permanent magnets disposed on its outside, arranged to give electromagnetic coupling with the primary and secondary windings mounted inside a stationary cylindrical element.

19. The apparatus of claim 1 wherein said bearing means employs ferrofluidic bearings.

20. The apparatus of claim 1 wherein said beating means employs air bearings.

21. The apparatus of claim 1 wherein said beating means employs ball bearings.

22. The apparatus of claim 1 wherein said permanent magnets include neodymium-iron material.

23. The apparatus of claim 1 wherein said permanent magnets include samarium-cobalt material.

24. The apparatus of claim 1 wherein said rotary element includes spent uranium material.

* * * * *